United States Patent [19]

Ozeki et al.

[11] Patent Number: 5,305,318
[45] Date of Patent: Apr. 19, 1994

[54] METHOD FOR CONTROLLING DATA TRANSMISSION OF AN INTEGRATED SERVICES DIGITAL NETWORK TERMINAL HAVING A MULTI-CHANNEL DATA TRANSMISSION CAPABILITY

[75] Inventors: Shinichiro Ozeki, Isehara; Fumihiro Ogasawara, Ebina, both of Japan

[73] Assignee: Ricoh Company, Ltd., Tokyo, Japan

[21] Appl. No.: 787,633

[22] Filed: Nov. 4, 1991

[30] Foreign Application Priority Data

Nov. 9, 1990 [JP] Japan .................. 2-302582

[51] Int. Cl.$^5$ ................................ H04J 3/12
[52] U.S. Cl. .................. 370/85.7; 370/110.1
[58] Field of Search ........... 370/118, 85.7, 95.1, 370/110.1; 375/8, 38; 379/98, 93

[56] References Cited

U.S. PATENT DOCUMENTS

| | | | |
|---|---|---|---|
| 4,677,257 | 6/1987 | Ogasawara et al. | 472/137 |
| 4,841,373 | 6/1989 | Asami et al. | 358/257 |
| 4,862,456 | 8/1989 | Giorgio | 375/8 |
| 4,888,766 | 12/1989 | Ogawawara | 370/95.1 |
| 5,023,869 | 6/1991 | Grover et al. | 370/118 |
| 5,105,382 | 4/1992 | Ogasawara | 364/900 |

Primary Examiner—Benedict V. Safourek
Assistant Examiner—Min Jung
Attorney, Agent, or Firm—Oblon, Spivak, McClelland, Maier & Neustadt

[57] ABSTRACT

A method of controlling a data transmission from a sending terminal to a receiving terminal through a plurality of data channels in an integrated services digital network. The method includes steps of sending a procedural message from the first terminal to the second terminal via the network, sending, in response to the procedural message, a connection message from the second terminal back to the first terminal via the network, the connection message including user-user data in which a request data is set to a second value, determining the number of the data channels used simultaneously for the data transmission in response to the connection message, received by the first terminal, in which the second value of the request data is equal to a predetermined value, and performing the data transmission from the first terminal to the second terminal by using the determined number of the data channels simultaneously.

5 Claims, 8 Drawing Sheets

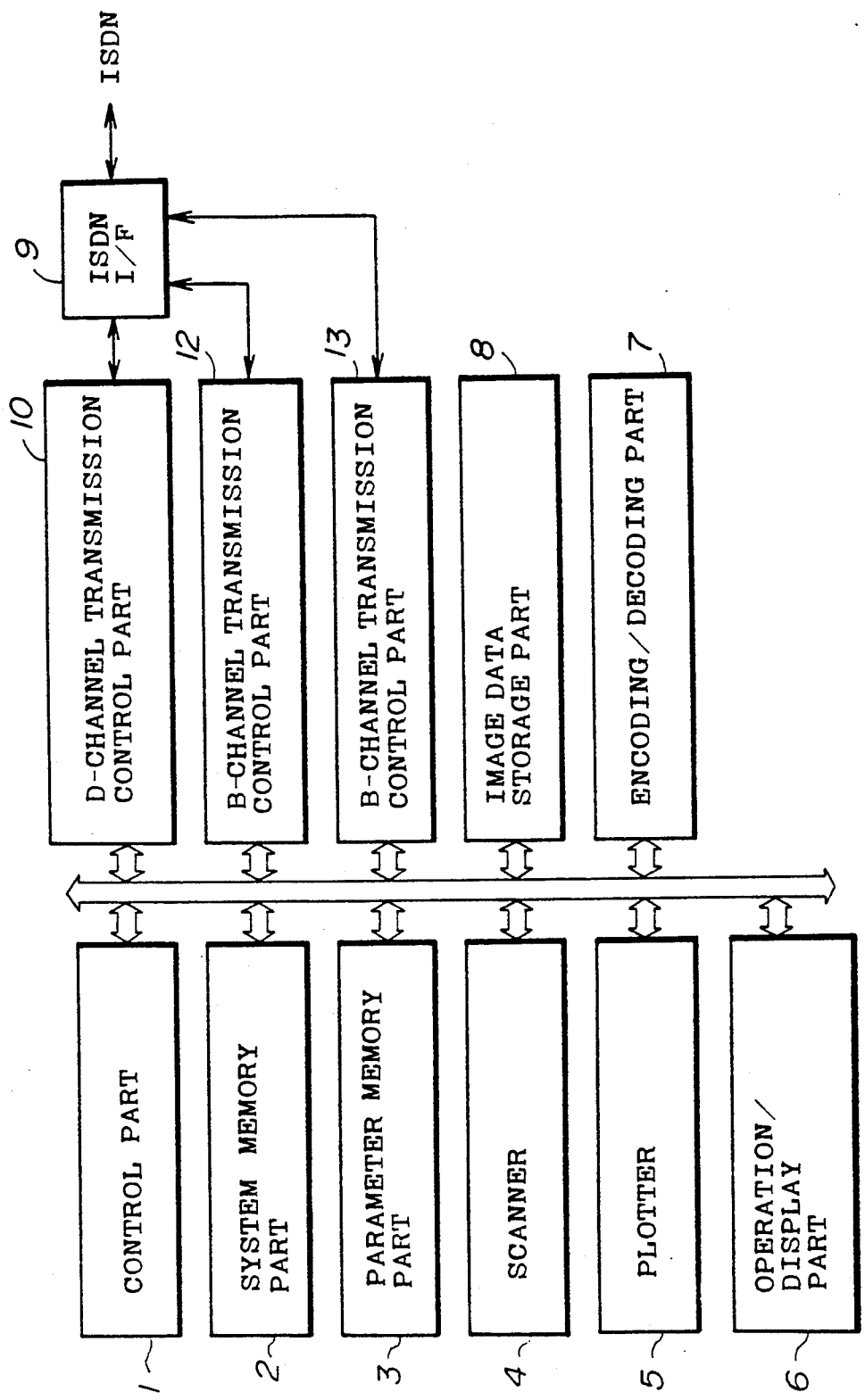

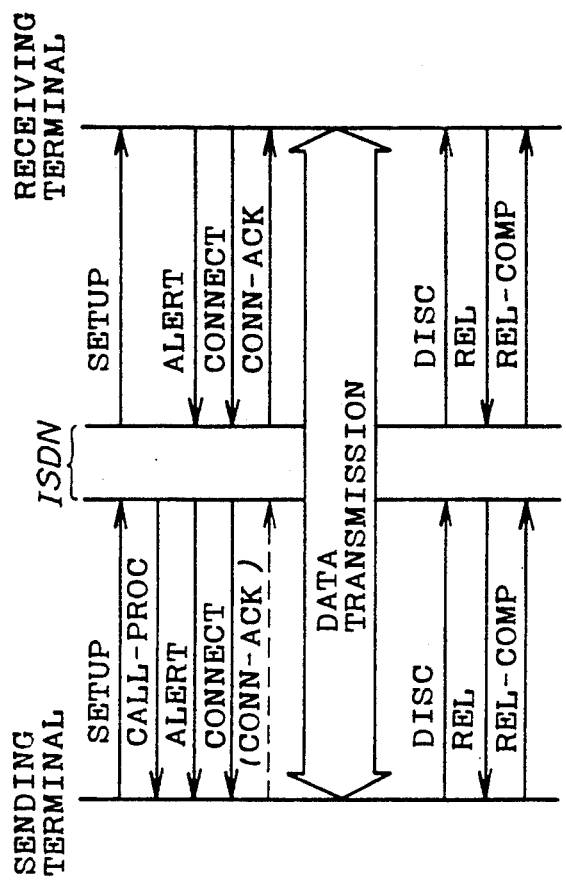

FIG.3B

| | |
|---|---|
| 26 | COMPATIBILITY DATA |
| 27 | RECEPTION REFERENCE |
| 28 | RECEPTION SUB-ADDRESS |
| 29 | LOW-LEVEL LAYER INTEGRITY DATA |
| 30 | USER-USER DATA |

FIG.3A

| | |
|---|---|
| 21 | PROTOCOL DISCRIMINATOR |
| 22 | CALL REFERENCE |
| 23 | MESSAGE TYPE |
| 24 | ESSENTIAL INFORMATION ELEMENTS |
| 25 | SUPPLEMENTARY INFORMATION ELEMENTS |

FIG.3C

| | |
|---|---|
| BID | B-CHANNEL SETUP REQUEST |
| BNU | REQUESTED B-CHANNEL NUMBER |

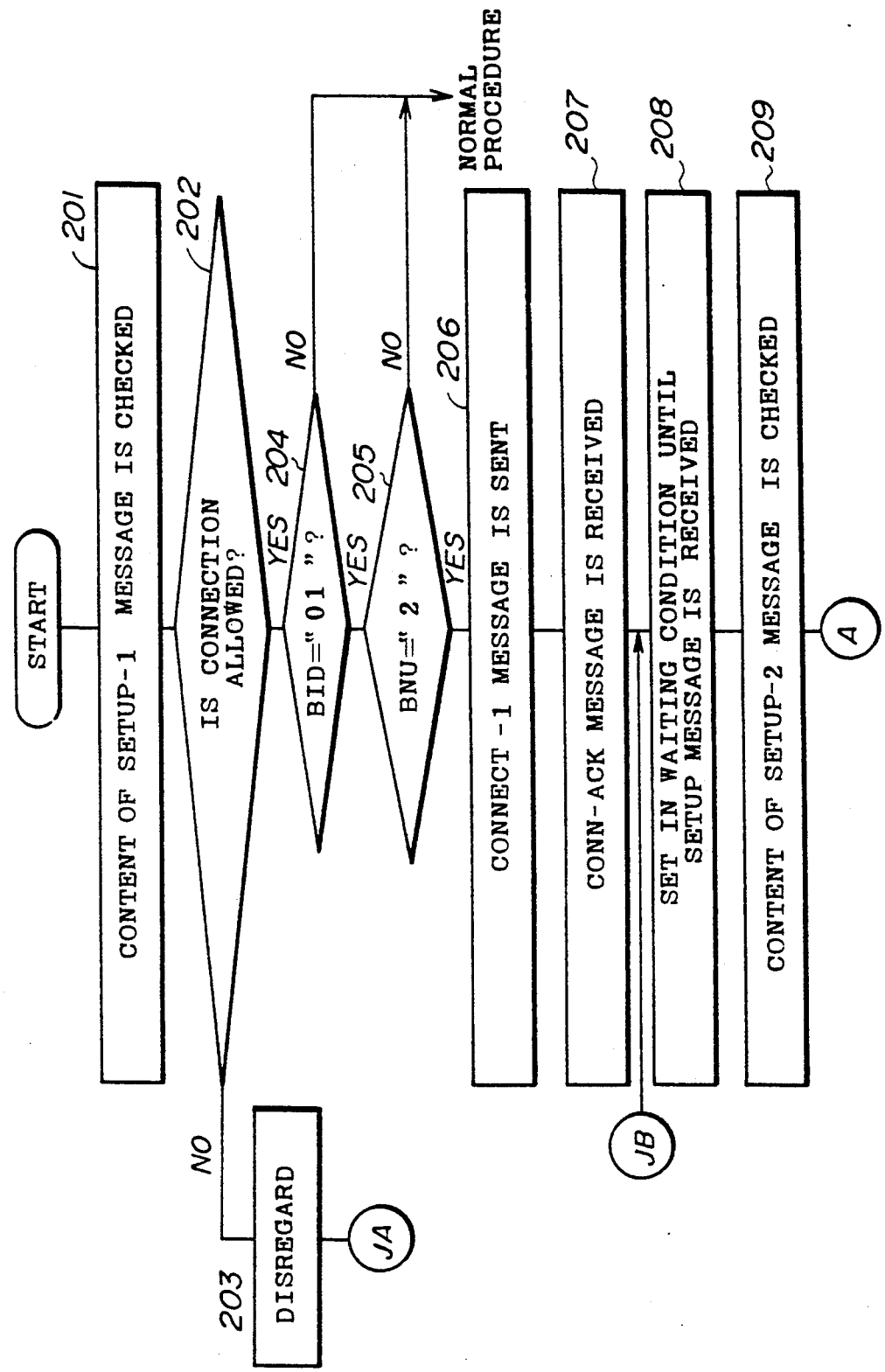

METHOD FOR CONTROLLING DATA TRANSMISSION OF AN INTEGRATED SERVICES DIGITAL NETWORK TERMINAL HAVING A MULTI-CHANNEL DATA TRANSMISSION CAPABILITY

BACKGROUND OF THE INVENTION

1. Field of the Invention

The present invention generally relates to a data transmission control method, and more particularly to a method of controlling data transmission, from a terminal to another terminal, through a plurality of data channels in an integrated-services digital network.

2. Discussion of the Background

A basic user-network interface in an integrated-services digital network (ISDN) includes several bearer capabilities that are allocated to users. One of the bearer capabilities is that an ISDN terminal connected to the network, via the basic user-network interface, designates a setting of the data transmission describing how the data is transmitted from the terminal to an ISDN receiving terminal. The setting of the data transmission is, for example, that the data is transmitted by using one of two data channels multiplexed to the basic user-network interface. In accordance with the setting inputted at a sending terminal, the ISDN performs a calling procedure for calling the receiving terminal to which the data is transmitted. When an ISDN terminal has two transmission control parts connected to the two data channels in the ISDN interface, and has a two-channel simultaneous transmission capability, which is achieved by operating the two transmission control parts simultaneously and independently, the data transmission can be performed, between the sending terminal and two other ISDN terminals, by using respectively the two data channels in the basic user-network interface, or between the ISDN terminal and a receiving ISDN terminal having the same capability by using simultaneously the two data channels.

As described above, the ISDN terminal which is connected to the ISDN via the basic user-network interface can freely designate a setting of the data transmission describing how the two data channels are used for the data transmission. Therefore, there is a demand for realization of the effective use of the network resources such as the two data channels in the basic user-network interface of the ISDN, and a desire for achieving various data transmission capabilities.

SUMMARY OF THE INVENTION

Accordingly, it is a general object of the present invention to provide an improved data transmission control method in which the above described problems are eliminated.

Another and more specific object of the present invention is to provide a data transmission control method of controlling data transmission from a terminal to another by making effective use of plural data channels in an intergrated services digital network, which enables fast and accurate data transmission. The above mentioned object of the present invention can be achieved by a data transmission control method which includes steps of sending a procedural message from a first terminal to a second terminal via the network, the procedural message including user-user data in which a request data is set to a first value, sending a connection message from the second terminal to the first terminal via the network in response to the procedural message, the connection message including user-user data in which a request data is set to a second value, determining the number of the data channels used simultaneously for the data transmission in response to the connection message received by the first terminal in which the second value of the request data is equal to a predetermined value, and performing the data transmission from the first terminal to the second terminal by using the thus determined number of the data channels simultaneously. According to the present invention, the number of data channels being used simultaneously is determined by exchanging procedural messages between a sending terminal and a receiving terminal, and the data transmission is performed by using simultaneously the determined number of data channels. Therefore, the data transmission procedure can be carried out effectively.

Other objects and further features of the present invention will be apparent from the following detailed description when read in conjunction with the accompanying drawings.

BRIEF DESCRIPTION OF THE DRAWINGS

FIG. 1 is a block diagram showing a preferred embodiment of a G4 facsimile apparatus to which the present invention may be applied;

FIG. 2 is a time chart for explaining a setup procedure which is performed by a sending terminal and a receiving terminal via a network;

FIGS. 3A, 3B and 3C are diagrams showing a signal format of a procedural message, a signal format of the essential parts of a procedural message, and a signal format of user-user data as one of the essential parts of a procedural message, respectively;

FIGS. 7A and 7B are flow charts for explaining a data reception procedure which is performed by a receiving terminal when data is transmitted.

DESCRIPTION OF THE PREFERRED EMBODIMENTS

Figure 4:
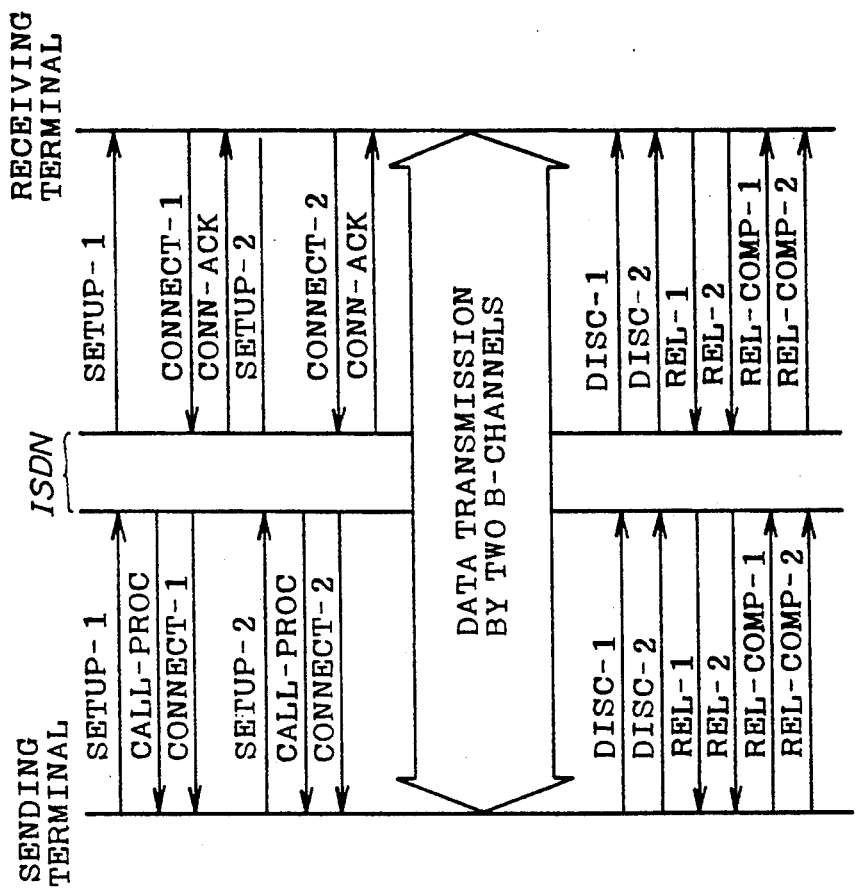
FIG. 4 is a time chart for explaining a data transmission procedure in which image data is transmitted using two data channels simultaneously.

A description will now be given of a G4 facsimile apparatus to which the present invention may be applied, with reference to FIG. 1. In FIG. 1, there are provided a control part 1 for controlling several operations of components of this G4 facsimile apparatus, a system memory part 2 in which control programs being executed by the control part 1 and several control data required for the control operations are stored, the system memory part 2 constituting a working area for the control part 1, and a parameter memory part 3 in which necessary data intrinsic to the G4 facsimile apparatus is stored. The facsimile apparatus shown in FIG. 1 further includes a scanner 4, a plotter 5, an operation/display part 6, an encoding/decoding part 7, an image data storage part 8, an ISDN interface 9, a D-channel transmission control part 10, B-channel transmission control parts 12, 13, and a system bus 14. The scanner 4 reads out an image signal at a given resolution by scanning an original document, and the plotter 5 outputs image data at a given resolution. The operation/display part 6 includes several operations keys and several displays used for operating and controlling the facsimile apparatus.

The encoding/decoding part 7 encodes the image signal, by compression, into a coded signal, and decodes a coded image signal into the original image signal. The image storage part 8 stores several coded image signals from the encoding/decoding part 7. The ISDN interface part 9 enables the facsimile apparatus to connect to the ISDN, so as to yield information to the ISDN and/or acquire information from the facsimile apparatus. The ISDN interface part 9 has separation/integration capabilities for the separation and integration of one signal channel (a so-called D channel with a transmission rate of 16 Kbps) and two data channel (so-called B channels, each with a transmission rate of 64 Kbps). The D-channel transmission control part 10, connected to the ISDN interface part 9, controls signaling processes of the D channel including setup and release processes. The B-channel transmission control parts 12 and 13, each being connected to the ISDN interface part 9, control data transmission processes of the two B channels. The B-channel transmission control parts 12 and 13 can independently perform data transmission procedures of the G4 facsimile, and have multi-channel simultaneous transmission capability, that is, a data file of image data to be transmitted is divided into small data blocks and the data blocks are each transmitted to another facsimile apparatus in a parallel manner. The system bus 14 interconnects the above mentioned parts as shown in FIG. 1, the components including the control part 1, the system memory part 2, the parameter memory part 3, the scanner 4, the plotter 5, the operation/display part 6, the encoding/decoding part 7, the image storage part 8, the D-channel transmission control part 10, and the B-channel transmission control parts 12 and 13, so that data or signals are yielded and acquired from one component to another through the system bus 14.

FIG. 2 shows a call control procedure which is carried out in a circuit switching mode by terminals connected to an integrated services digital network (ISDN). The sending terminal sends to the ISDN a setup message SETUP in which a circuit switching mode is set as a transfer mode (which will be described below) and a receiving terminal is designated as the destination to which a message is directed, and requests the ISDN a data transmission from the sending terminal to the receiving terminal. The setup message SETUP is also sent from the ISDN to the designated receiving terminal and the receiving terminal is called from the ISDN. Also, a call acceptance message CALL-PROC is sent from the ISDN to the sending terminal so that the sending terminal is notified of a call setup condition of the terminals. When it is called, the receiving terminal sends to the ISDN a calling message ALERT when the receiving terminal is in a condition in which the data reception is allowed. The ISDN sends to the sending terminal the calling message ALERT, so that the sending terminal is notified of the start of the procedure calling the receiving terminal.

After the receiving terminal replies to the call, it sends to the ISDN a connection message CONNECT, and the ISDN sends back to the sending terminal the connection message CONNECT, notifying the sending terminal that the receiving terminal has accepted the call. Also, the ISDN, in response to the connection message, sends back to the receiving terminal a connection acknowledgment message CONN ACK, so that a data channel (a so-called B channel) is set in order to perform a data transmission between the sending and receiving terminals. Data transmission is performed, via this data channel, from the sending terminal to the receiving terminal or vice versa in accordance with a control procedure which is predetermined with the data transmission capability of each of the sending and receiving terminals.

After the data transmission has ended, the sending terminal sends to the ISDN a disconnection message DISC, requesting the ISDN to release the data channel. The ISDN sends to the receiving terminal the disconnection message DISC so that the receiving terminal is notified of the recovery of the data channel. In response to the disconnection channel, the receiving terminal sends to the ISDN a release message REL, and the ISDN sends to the sending terminal the release message REL. After the channel release has been completed, the sending terminal sends back to the ISDN a release completion message REL_COMP, notifying of the completion of the channel release. The ISDN, then, sends to the receiving terminal the release completion message REL_COMP. The channel release process has ended, and the data channel between the sending and receiving terminals is released completely.

FIG. 3A shows an example of several procedural messages which are exchanged between the sending terminal and the receiving terminal for the call setup. As shown in FIG. 3A, each of the procedural messages includes a protocol discriminator 21 discriminating protocol specifications, such as the format or the sequence, denoting that the related procedural message is a prescribed layer-3 call control message, a call reference 22 showing which call the related procedural message is related to, a message type 23 identifying the type of the related procedural message from which the content of the message is identified, essential information elements 24 which are included in every procedural message, supplementary information elements 25 which are included in certain procedural messages only. The number of essential information elements 24 included in a procedural message varies depending on the message type 23 of the procedural message. The number of the essential information elements 24 may be zero, one, two or more. Also, the number of supplementary information elements included in a procedural message may be zero, one, two or more, depending on the conditions or instances of data transmission.

FIG. 3B shows a signal format of a setup message SETUP which is sent for the call setup from the sending terminal to the receiving terminal via the ISDN. As shown in FIG. 3B, the setup message includes one essential information element and four supplementary information elements, the essential information element being a compatibility data 26, the supplementary information elements including a reception reference 27, a reception sub-address 28, a low-level layer-integrity data 29 and user-user data 30. A description will now be given of these information elements which are included in a setup message. The compatibility data 26 include a transmission capability data denoting whether or not image data being transmitted pertain to any of the voice data, unlimited digital data, limited digital data, 3.1-kHz audio data, 7-kHz audio data and video data, a transfer mode showing whether a circuit switching mode or a packet switching mode is used for data transmission, a transfer rate denoting the speed of data transmission, a data transfer format denoting an image data format in which data is transmitted, and a protocol data showing a user data protocol used by the user for data transmission.

The reception reference 27 represents a reference number of a receiving terminal which is recognizable to the network system. The reception sub-address 28 is a reference data for identifying the subject receiving terminal out of eight or fewer terminals to be connected within the same in-house wiring equipment or the same passive bus. The format of the reception sub-address 28 may be arbitrarily defined by the users. The low-level layer-integrity data 29 is used for checking transmission compatibility of the data to be transmitted. The low-level layer-integrity data 29 is basically the same as the compatibility data 26. The low-level layer integrity data 29 further include other detailed data. The user-user data 30 are used for exchanging certain procedural data between different terminals. The ISDN usually does not interpret the content of the user-user data 30, and the user-user data 30 is transferred from the sending terminal to the receiving terminal, via the ISDN or vice versa, in a transparent manner, so that the terminal having received the user-user data 30 is notified of a specified procedural data for determining a data transmission process.

FIG. 3C shows a signal format of user-user data 30 which is included in the setup message shown in FIG. 3B. This user-user data 30 include a B-channel setup request data BID and a requested channel number data BNU. The B-channel setup request data BID is a procedural data for determining the number of B channels which must be simultaneously used for the data transmission between the sending and receiving terminals. The requested channel number data BNU is a procedural data for defining the number of B channels being used simultaneously for data transmission.

In the present embodiment, the B-channel setup request data BID in the user-user data 30 is set to one of four different hexadecimal numbers which follow. The hexadecimal data include "01 (H)", "02 (H)", "03 (H)" and "04 (H)" (the letter H denoting hexadecimal notation). When the BID is set to "01 (H)", in the present embodiment, it means that the sending terminal invites or requests the ISDN to perform a multi-channel setup process for transmitting data to the receiving terminal by using a plurality of B channels simultaneously. When the BID is set to "02 (H)", it means that the receiving terminal accepts the invitation of th sending terminal for the multi-channel data transmission. When the BID is set to "03 (H)", it means that the receiving terminal rejects the invitation of the sending terminal because the plurality of B channels are not usable for the receiving terminal. When the BID is set to "04 (H)", it means that the sending terminal declares to the ISDN that a multi-channel data transmission, from the sending terminal to the receiving terminal, is performed by using the plurality of B channels simultaneously.

Next, a description will be given of a data transmission procedure which is performed by using two B channels simultaneously, with reference to FIG. 4. The sending terminal sends to the ISDN a first setup message SETUP-1 in which the channel setup request data BID in the user-user data 30 is set to "01 (H)" (representing invitation) and the requested channel number data BNU is set to "2" (representing simultaneous two-channel transmission). The receiving terminal sends to the ISDN, in response to the first setup message SETUP-1 from the ISDN, a first connection message CONNECT-I in which the BID in the user-user data 30 is set to "02 (H)" (representing acceptance) if two data channels are at that time both usable for the receiving terminal. The ISDN sends the first connection message CONNECT-1 to the sending terminal. The sending of this first connection message back to the sending terminal enables a first transmission path to be established in the ISDN for transmitting data from the sending terminal to the receiving terminal.

After receiving the first connection message CONNECT-1 from the ISDN, the sending terminal sends back to the ISDN a second setup message SETUP-2 in which the BID is set to "04 (H)" (representing declaration), the BNU is set to "2", and the ISDN sends to the receiving terminal the second setup message SETUP-2. In response to the second setup message SETUP-2 from the ISDN, the receiving terminal sends to the ISDN a second connection message CONNECT-2, in which the BID in the user-user data 30 is set to "02 (H)" (representing acceptance), and the BNU is set to "2" (representing simultaneous two-channel data transmission). The ISDN sends to the sending terminal the second connection message CONNECT-2. The sending of this second connection message back to the sending terminal enables a second transmission path to be established for transmitting data from the sending terminal to the receiving terminal. In this manner, the first and second transmission paths are established in the ISDN. Consequently, the sending and receiving terminals perform data transmission of a data file of image signals by using the two channels B1 and B2 simultaneously.

The data file to be transmitted is, for example, divided into a plurality of data blocks and a serial number is assigned to each of the data blocks. Data blocks with odd serial numbers are, for example, sent to the receiving terminal through the B1 channel, while data blocks with even serial numbers are transmitted through the B2 channel. The receiving terminal receives the data blocks from the ISDN, and re-arranges them in sequence as per the serial number assigned to each of the data blocks, thus integrating the original data file from the sending terminal, and outputting an image of the rearranged data file.

After the data transmission ends, the sending terminal sends to the ISDN a first disconnection message DISC-1 so as to release one of the two B channels, it also sends to the ISDN a second disconnection message DISC-2 in order for releasing the other B channel, so that both the two B channels are released. Therefore, the data file can be transmitted to the receiving terminal, through the network, at a transmission rate of 128 kbps because the two B channels are simultaneously used, hence remarkably reducing the time required for data transmission.

Figure 5:
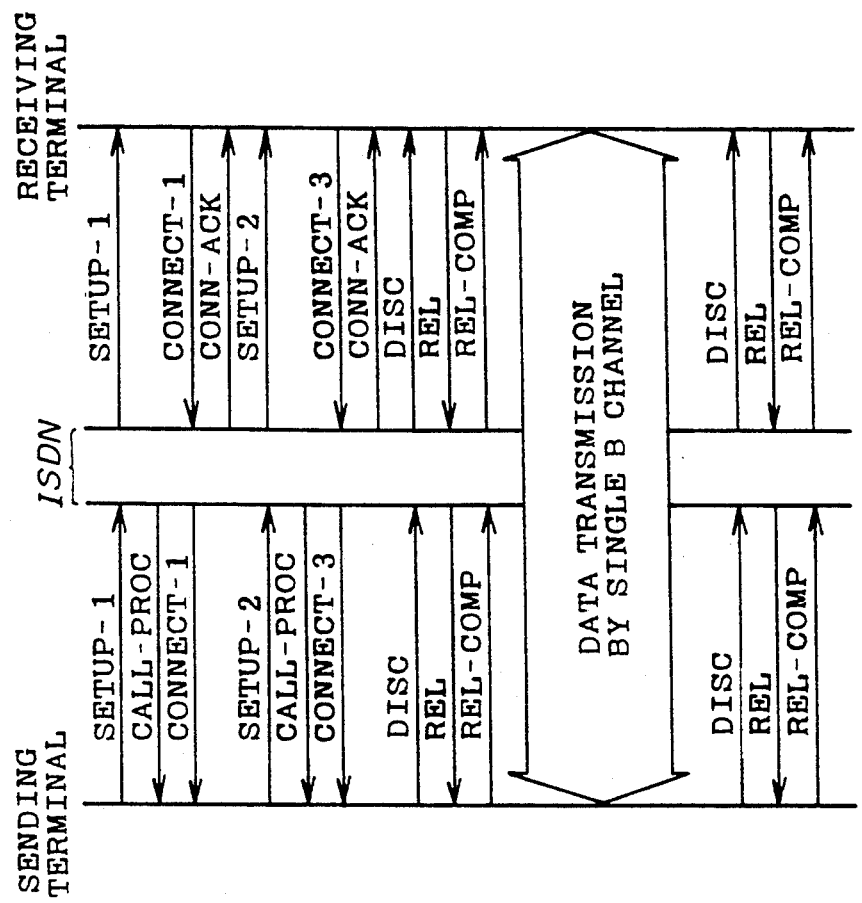
FIG. 5 is a time chart for explaining a data transmission procedure in which image data is transmitted using only one data channel.

Next, a description will be given of a case in which the sending terminal requests the ISDN to use two B channels simultaneously but only one B channel is usable by the receiving terminal, with reference to FIG. 5. In FIG. 5, those parts which are the same as those corresponding parts in FIG. 4 are designated by the same reference numerals and characters, and a description thereof will be omitted. In response to the second setup message SETUP-2, which is sent by the sending terminal for requesting the ISDN to capture a second B channel, the receiving terminal sends to the ISDN a third connection message CONNECT-3 in which the BID in the user-user data 30 is set to "03 (H)" (representing rejection). The ISDN sends the third connection message to the sending terminal. After receiving the third connection message CONNECT-3 from the ISDN, the sending terminal sends back to the ISDN a disconnection message DISC so that a setup procedure for the second B channel is discontinued. After this disconnection message is received by the receiving terminal from the ISDN, data transmission from the sending terminal to the receiving terminal is performed via only the first B channel. After the data transmission has ended, a disconnection procedure is performed by sending a disconnection message from the sending terminal to the receiving terminal, so that the first B channel is disconnected from the network. In this manner, when the receiving terminal cannot use two B channels simultaneously, the data file transmission is performed by using one B channel, making it possible to perform an appropriate data transmission procedure, in response to the operating condition of the receiving terminal.

Figure 6:
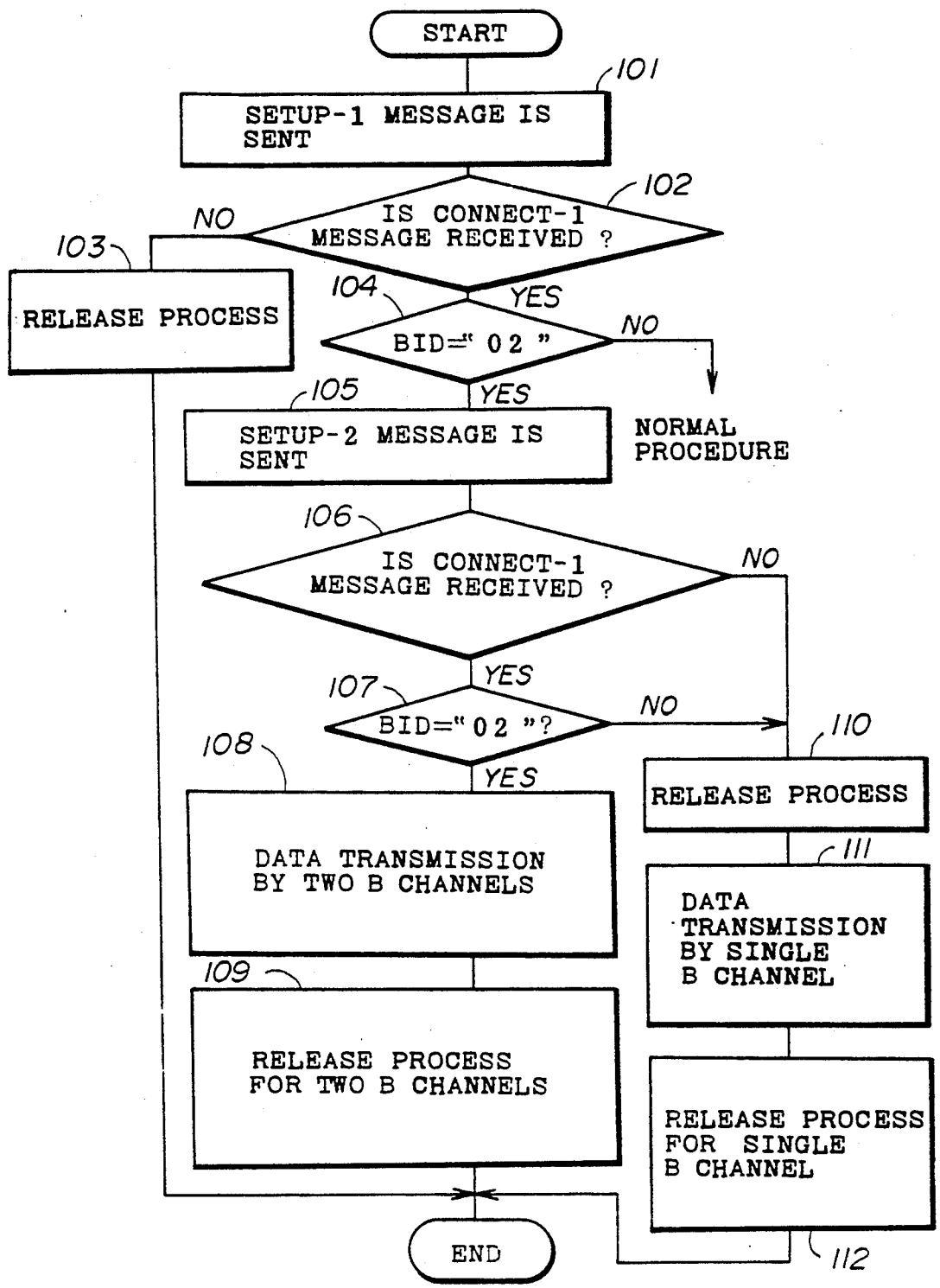
FIG. 6 is a flow chart for explaining a data transmission procedure which is performed by a sending terminal when data is transmitted.

FIG. 6 shows a detailed data transmission procedure performed by the sending terminal. A step 101 of the flow chart shown in FIG. 6 performs a first setup process, during this setup process the sending terminal sends to the ISDN a first setup message SETUP-1 in which a receiving terminal is designated as the destination station and in which the B-channel setup request data BID in the user-user data 30 is set to "01 (H)" (representing invitation) and the requested channel number data BNU is set to "2" (representing two-channel simultaneous data transmission). A step 102 checks whether or not a first connection message CONNECT-1 in reply to the first setup message is received during the first setup process. If the connection message CONNECT-1 is not received, a step 103 performs a release process and the first setup process for the first call is discontinued. If the CONNECT-1 message is received from the receiving terminal, a step 104 determines whether the B-channel setup request data BID in the user-user data 30 is equal to "02 H)" or not.

When the CONNECT-1 message includes no user-user data 30, or when the B-channel request data BID is set to "03 (H)" (representing rejection), the answer in the step 104 is negative, that is, the BID included in the first connection message CONNECT-1 is not equal to "02 (H)". In this case, the process is transferred to a normal data transmission procedure in which a data file of image signals is transmitted from the sending terminal to the receiving terminal using a single B channel.

When the step 104 determines that the BID is equal to "02 (H)", a step 105 sends from the sending terminal to the receiving terminal via the ISDN a second setup message SETUP-2 in which the same receiving terminal is designated and in which the B-channel setup request data BID in the user-user data 30 is set to "04 (H)" (representing declaration) and the requested channel number data BNU is set to "2". A step 106 checks whether or not a second connection message CONNECT-2 in reply to the second setup message is received from the receiving terminal during the second setup process. When the answer in the step 106 is affirmative, a step 107 determines whether or not the B-channel request data BID in the user-user data 30 included in the second connection message CONNECT-2 is equal to "02 (H)" or not. If the answer in the step 107 is affirmative, two B channels B1, B2 are captured as transmission paths. A step 108 performs a data transmission procedure for transmitting data to the receiving terminal using the two B channels simultaneously. After the data transmission procedure has ended, a step 109 performs a release process so as to release both channels B1 and B2. The data transmission procedure performed by the sending terminal is thus completed.

When it is determined in the step 106 that the second connection message CONNECT-2 is not received, or when the B-channel request data BID in the user-user data 30 is set to "03 (H)" and the answer in the step 107 is negative, that is, when the BID in the CONNECT-2 message is not equal to "02 (H)", a step 110 performs a release process so as to release a second B channel for the second call. A step 111 performs a data transmission process using a first B channel which has already been captured as the transmission path. After the data transmission procedure using the single B channel has ended, a step 112 performs a release process so as to release the first B channel. Thus, the data transmission procedure performed by the sending terminal is completed.

Figure 7B:
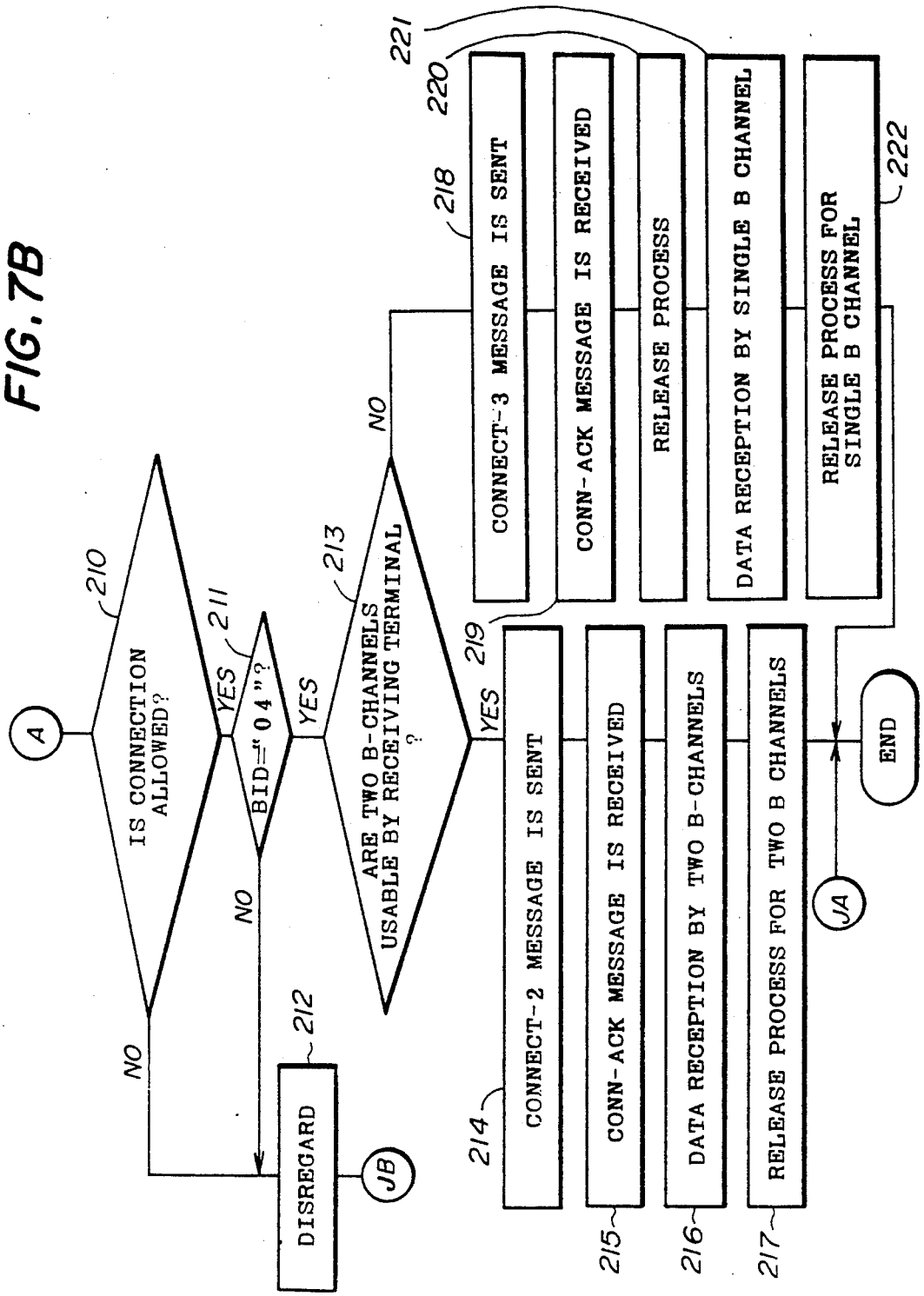

FIGS. 7A and 7B show a data reception procedure performed by the receiving terminal. A step 201 in the flow chart shown in FIG. 7A checks the content of a first setup message SETUP-1 which is received from the sending terminal by the receiving terminal. A step 202 determines whether or not a connection of the receiving terminal with the sending terminal via the ISDN is allowed. If the answer in the step 202 is negative, a step 203 disregards the call from the sending terminal, and the data reception procedure is discontinued.

When the connection between the sending terminal and the receiving terminal is allowed, a step 204 checks whether or not the B-channel setup request data BID in the user-user data 30, included in the first setup message SETUP-1, is equal to "01 (H)", and a step 205 checks whether or not the requested channel number data BNU in the first setup message is equal to "2". When the answer in the step 204 or the step 205 is negative, the process is transferred to a normal data reception procedure, for transmitting data using a single data channel.

When the answers in the steps 204 and 205 are both affirmative, a step 206 sends a first connection message CONNECT-1 from the receiving terminal to the ISDN in response to the first setup message SETUP-1 from the sending terminal, in which first connection message the BID in the user-user data 30 is set to "02 (H)". In a step 207, a connection acknowledgment message CON-N_ACK from the ISDN is received by the receiving terminal, so that a first data transmission path is established. In a step 208, the receiving terminal is set in a waiting condition until a second setup message SETUP-2 is received from the sending terminal. When the SETUP-2 message is received by the receiving terminal, a step 209 checks the contents of the second setup message SETUP-2.

A step 210 in the flow chart shown in FIG. 7B determines whether or not the connection between the sending terminal and the receiving terminal is allowed. If the answer in the step 211 is affirmative, a step 211 determines whether or not the B-channel setup request data BID in the user-user data 30, included in the second setup message SETUP-2, is equal to "04 (H)".

When the answer in the step 210 or the step 211 is negative, a step 212 disregards the call from the sending terminal, and the process is transferred to the step 208, so that the receiving terminal is reset in a waiting condition until another setup request message is received from the sending terminal.

When the answer in the step 211 is affirmative, a step 213 checks whether or not the two B channels are usable for the receiving terminal at that time. If the answer in the step 213 is affirmative, a step 214 sends to the ISDN from the receiving terminal a second connection message CONNECT-2 in which the B-channel setup request data BID in the user-user data 30 is set to "02 (H)" (representing acceptance). A step 215 receives a connection acknowledgment message CONN_ACK from the ISDN, so that two transmission paths for transmitting data using two B channels simultaneously are established. A step 217 then performs a data reception process for receiving data from the sending terminal using the two B channels simultaneously, and the data reception procedure is completed.

When the answer in the step 213 is negative, the receiving terminal, in a step 218, sends back to the ISDN a third connection message CONNECT-3 in which the B-channel setup message data BID in the user-user data is set to "03 (H)". A step 219 receives a connection acknowledgment message CONN ACK from the ISDN, and a step 220 performs a channel release process so that the second B channel, for the second call, is released. A step 221 performs a data reception process by using only the first B channel which has been already captured as the transmission path. After the data reception process using only the first B channel ends, a step 222 performs a release process so as to release the first B channel from the network, and the data reception procedure by the receiving terminal is completed.

In the above described embodiment, the data transmission control method according to the present invention is applied to a G4 facsimile apparatus. However, the present invention is not limited to this embodiment, and the data transmission control method is also applicable to a so-called multi-media terminal device in the same manner as described above.

In the above described embodiment, the user-user data included in the setup message which is set to one of the four different numbers is exchanged between the terminals during the setup process, for determining the number of data channels simultaneously used for data transmission. However, the number of the data channels may be determined by using other signals being transmitted to a data channel, instead of the setup message.

In the above described embodiment, a case is described in which the data transmission method of the present invention is applied to a G4 facsimile apparatus as the terminal device connected to the ISDN basic user-network interface. It is to be noted, however, that the present invention is also applicable to an ISDN terminal device connected to a primary rate user-network interface which will achieve faster data transmission.

Furthermore, the present invention is not limited to the above described embodiments, and variations and modifications may be made without departing from the scope of the present invention.

What is claimed is:

1. A method of controlling data transmission of a terminal connected to an integrated services digital network which transmits data to a receiving terminal using a plurality of data channels available in the network, said method comprising the steps of:

transmitting a procedural message from a first terminal to the network so that the procedural message is sent from the network to a second terminal, said procedural message including user-user data in which a channel setup request item is set to a unique first value and a requested channel number item is set to a unique second value;

receiving a connection message at the first terminal from th second terminal via the network in response to the procedural message transmitted by the first terminal, said connection message including user-user data which indicates whether the second terminal accepts the channel setup request and requested channel number from the first terminal, the sending of this connection message from the second terminal to the first terminal establishing a first channel for transmuting information between the first and second terminals;

wherein said transmitting of the procedural message and said receiving of the connection message are repeated until all the data channels indicated by the requested channel number item of the user-user data are established; and transmitting data from the first terminal to the second terminal through the network by simultaneously using the thus determined number of the data channels.

2. The method as claimed in claim 1, wherein said procedural message and said connection message are exchanged between the first and second terminals after a transmission path is established for transmitting data from the first terminal to the second terminal.

3. The method as claimed in claim 1, wherein said first terminal uses a basic user-network interface in the integrated services digital network to transmit a procedural message to the network.

4. The method as claimed in claim 1, wherein said integrated services digital network includes at least a signal channel and two data channels through which data is transmitted from a sending terminal to a receiving terminal.

5. The method as claimed in claim 1, wherein said first and second terminals each have capabilities of being connected to a basic user-network interface in an integrated services digital network and performing multi-channel simultaneous data transmission through the plurality of data channels.

* * * * *